United States Patent [19]

Guerty

[11] Patent Number: 4,828,173
[45] Date of Patent: * May 9, 1989

[54] AREA CONTROLLED, THRUST VECTORING VANE CASCADE

[75] Inventor: Harold G. Guerty, Palm Beach Gardens, Fla.

[73] Assignee: United Technologies Corporation, Hartford, Conn.

[*] Notice: The portion of the term of this patent subsequent to Jan. 17, 2006 has been disclaimed.

[21] Appl. No.: 53,288

[22] Filed: May 22, 1987

[51] Int. Cl.[4] .................................................. F02K 1/76
[52] U.S. Cl. .................................. 239/1; 239/265.19; 239/265.25; 60/242; 244/110 B
[58] Field of Search .................... 244/110 B, 115, 12.5; 60/228, 230, 239, 242; 239/265.11, 265.19, 265.25, 265.27, 265.29, 265.35

[56] References Cited

U.S. PATENT DOCUMENTS

| 3,025,667 | 3/1962 | Moorehead | 239/265.35 X |
| 3,100,377 | 8/1963 | Kosin et al. | 60/35.54 |
| 3,174,709 | 3/1965 | Alderson | 239/265.25 X |
| 3,335,960 | 8/1967 | Alderson | 239/265.27 |
| 3,344,604 | 10/1967 | Mattia et al. | 60/229 |
| 3,601,992 | 8/1970 | Maison | 60/226 |
| 4,073,440 | 2/1978 | Hapke | 239/265.29 |
| 4,183,478 | 1/1980 | Rudolph | 244/110 B |
| 4,241,647 | 12/1980 | Herr | 98/121 A |
| 4,641,782 | 2/1987 | Woodward | 239/265.29 |

Primary Examiner—Andres Kashnikow
Assistant Examiner—Kevin P. Weldon
Attorney, Agent, or Firm—Troxell K. Snyder

[57] ABSTRACT

A plurality of cascade vanes (28, 29, 30) pivot in unison for selectably directing a flow of gas (20) therethrough. A flow regulating vane (36) disposed adjacent one end vane of the plurality of cascade vanes (28, 29, 30) pivots (46) counterrotationally with respect to the cascade vanes (28, 29, 30) for maintaining a constant collective gas flow area.

5 Claims, 5 Drawing Sheets

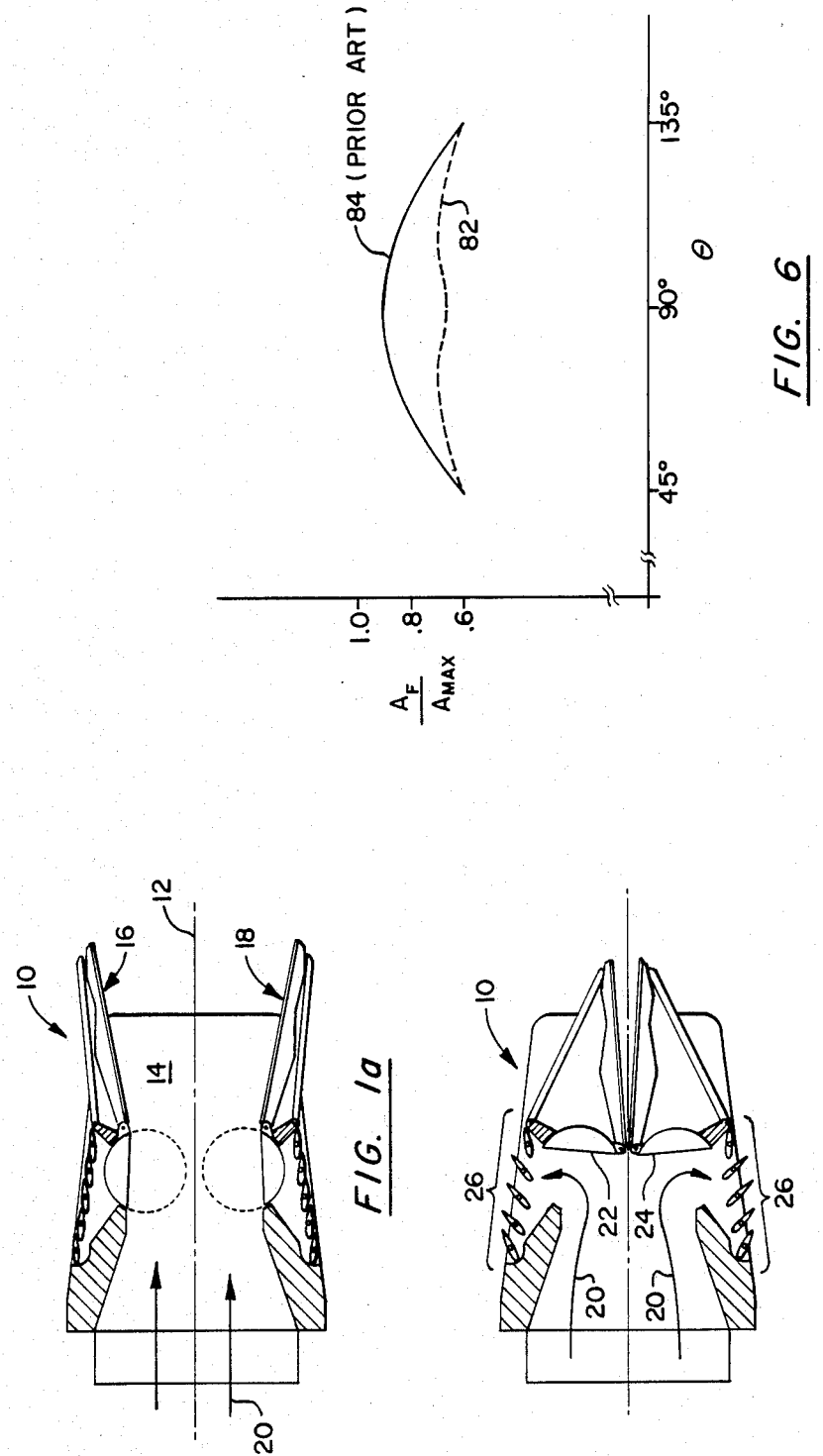

AREA CONTROLLED, THRUST VECTORING VANE CASCADE

This invention was made with Government support under a contract awarded by the Department of the Air Force. The Government has certain rights in this invention.

CROSS-REFERENCE TO RELATED APPLICATIONS

Attention is hereby directed to copending, commonly assigned U.S. patent applications "Linkage for Area Controlled, Thrust Vectoring Vane Cascade", Eric J. Ward, Philip R. Scott and Edward B. Thayer, and "Area Controlled, Thrust Vectoring Vane Cascade With Nutating Control Vane", Edward B. Thayer, Philip R. Scott and Thomas A. Roach, filed on even date herewith and which disclose related subject matter.

TECHNICAL FIELD

This invention relates to a vane cascade having a plurality of variable position, pivoting vanes for directing a flow of gas.

BACKGROUND

The use of a cascade of individually pivotable vanes for selectably diverting a flow of gas passing therethrough is a known method for achieving a desired thrust direction in an aircraft or other similar application. Such systems may be used to provide additional lift during certain flight maneuvers, or to reverse the normal direction of thrust from a gas turbine engine or the like in order to decelerate the aircraft during landing or at other times.

One such variable position vane cascade is shown in U.S. Pat. No. 3,100,377 issued to R. E. Kosin et al. The outlet of a gas turbine engine is provided with a plurality of individual movable vanes for directing the engine exhaust either rearwardly along the main axis of the aircraft during normal forward flight, or downwardly, transverse to the major aircraft axis for providing additional upward lift during vertical or short takeoff or landing maneuvers. The vanes traverse a range of motion between these two positions, thus providing a plurality of intermediate thrust vectors for transitioning between these two flight modes.

U.S. Pat. No. 3,335,960 issued to E. D. Alderson shows a gas turbine engine outlet equipped with a plurality of movable vanes for providing both thrust vectoring and thrust control by spoiling the gas flow stream in order to reduce thrust. While known in the prior art, such variable position vane cascades typically utilize a plurality of actuators for aligning each vane according to an individual schedule or other control signal to provide the desired collective thrust vector and/or gas outlet flow area.

In particular, for vane cascades wherein it is desired to provide thrust vectoring for a flow of exhaust gas from a gas turbine engine or the like, it is desirable that the collective exhaust gas flow area through the cascade be held nearly constant in order to avoid inducing instability in the operation of the gas turbine engine. As will be appreciated by those skilled in the operation of gas turbine engines, a rapid increase or decrease in the area of the engine exhaust nozzle can lead to engine rotor overspeed or compressor blade stalling, respectively.

For vane cascades having a plurality of vanes pivoting in unison for vectoring thrust, it will be appreciated that the nozzle outlet area measured normal to the flow of gas from the vectoring cascade will be a function of the sine of the vane angle. Thus, the outlet area of the cascade having vanes positioned at a 45° angle with respect to the general cascade plane will be approximately 70% of the flow area with the vanes oriented normally, i.e. 90°, with respect to the cascade plane.

This nearly 30% variation in gas flow area can occur in applications wherein a variable vane cascade is provided for discharging a flow of exhaust gas from a thrust-reversing and/or thrust-maneuvering gas turbine engine exhaust nozzle. In such applications it is desirable to orient the plane of the cascade transversely with respect to the aircraft major axis, pivoting the individual vanes in unison to direct the flow of exhaust gases rearwardly for achieving a forward thrust flight mode, laterally for achieving high transverse and no axial thrust, and forwardly for achieving a rearward or reversing thrust. As will be appreciated by those familiar with such thrust vectoring needs and applications, the time of transition between any two thrust modes may be on the order of 1-2 seconds, especially during landing or high speed evasion maneuvers.

As with any aircraft application, the requirement for reduced weight and complexity is a high priority goal for designers in this field. Multiple actuator arrangements, while providing high flexibility in positioning individual vanes, are relatively heavy and complex to operate. What is required is a simple, single actuator, variable position vane cascade which simultaneously vectors the flow of gas therethrough while maintaining a constant collective gas flow area.

SUMMARY OF THE INVENTION

It is therefore an object of the present invention to provide a vectoring vane cascade for selectably discharging a flow of gas turbine engine exhaust, or the like.

It is further an object of the present invention to provide a vane cascade which achieves a constant collective gas flow area over the range of vane motion corresponding to the thrust vectoring operation of the vane cascade.

It is further an object of the present invention to achieve such constant flow area by coordinating the movement of at least one flow regulating vane in an opposite direction of that of the cascade vanes, at least within the vectoring range of motion.

It is further an object of the present invention to provide a cascade and flow regulating vane arrangement wherein the flow regulating and cascade vanes are selectably pivotable into an overlapping arrangement for establishing a flow barrier to any gas flow therethrough.

It is still further an object of the present invention to provide a linkage for accomplishing such vane movement with only a single linear actuator.

According to the present invention, a thrust vectoring gas discharge vane cascade is provided with a plurality of spanwisely parallel pivoting vanes, movable in unison for selectably directing a flow of gas, such as the exhaust gas of a gas turbine engine, therefrom. The cascade vanes move between a plurality of flow directing positions, including a first forward thrust position in which the vanes are pitched for directing the exhausted gas rearwardly, a second, lateral thrust position in which the vanes are oriented normal to the general plane of the cascade structure for exhausting gas directly from the cascade, and a third, rearward thrust position in which the vanes are pitched for directing the exhausted gas forwardly.

The present invention further provides means for avoiding substantial variation in the collective cascade gas flow area as the vanes move over the flow directing, or thrust vectoring, range of motion. According to the present invention, a flow regulating vane is provided adjacent one of the end vanes of the cascade. The flow regulating vane is pivotable about an axis parallel to the pivot axes of the cascade vanes and is rotated contrary to the movement of the cascade vanes between the first, second, and third positions.

In operation, the flow regulating vane is chordwisely aligned with the cascade vanes when the cascade vanes are in the first and third positions, thereby cooperably exhausting gas from the cascade forwardly or rearwardly as desired. When the cascade vanes move into the second, normal position, an opposite rotational movement of the flow regulating vane results in a blocking orientation wherein the flow regulating vane is chordally perpendicular with the adjacent end cascade vane, thereby blocking off a portion of the gas flow and holding the collective cascade gas flow area constant.

A further embodiment of the present invention includes means for reversing the direction of rotation of the flow regulating vane as the cascade vanes move from one of the pitched, thrust vectoring positions into an overlapping, stowed position wherein each vane overlaps or otherwise contacts the next adjacent vane. The overlapped, stowed vanes provide a closed gas barrier for aerodynamic or flow blocking purposes.

The flow regulating vane, rotating now in unison with the cascade vanes as they move over a stowing range of motion defined between the first pitched position and the stowed, overlapping position, also achieves an overlapping orientation with respect to the adjacent end vane. This reversing pivoting motion of the flow regulating vane, also termed "nutation", provides a stowable, constant area vane cascade which is effective and efficient in providing selectable thrust vectoring in a variety of applications.

A further embodiment of the present invention provides a vane cascade with both first and second flow regulating vanes. Each flow regulating vane is positioned adjacent one or the other of the end vanes of the cascade. The flow regulating vanes pivot in conjunction with each other and oppositely with respect to the cascade vanes over the thrust vectoring range of motion, and, in the stowable embodiment, in conjunction with the cascade vanes over the stowing range of motion. By providing dual flow regulating vanes, the present invention allows greater flexibility in the arrangement and sizing of the cascade, as well as maintaining a generally constant thrust centerline during vectoring operation.

Another feature of the cascade according to the present invention is a linkage for orienting the individual blades by means of a single linear actuator. This linkage, by avoiding the multiple actuators common in the prior art, allows reduced weight and complexity, desirable features in aircraft as well as other applications.

More particularly, the linkage according to the present invention provides a single unison link driven by a linear actuator for positioning the cascade vanes in unison as set forth above. A cam race, secured to the unison link, drives a second linkage for imparting the appropriate nutational motion to the flow regulating vane or vanes in response to the translation of the unison link, thereby ensuring proper orientation of the flow regulating vane or vanes at every point within the cascade operating ranges of motion.

Both these and other objects and advantages of the cascade arrangement according to the present invention will be apparent following a review of the following description and the appended claims and drawing figures.

BRIEF DESCRIPTION OF THE DRAWINGS

FIGS. 1a and 1b show an axial cross section of a gas turbine engine exhaust nozzle including a vectoring vane cascade.

FIG. 6 shows a graphical representation of the variation of exhaust gas flow area of a vectoring vane cascade both for a simple unison cascade arrangement and for the flow controlled arrangement according to the present invention.

DETAILED DESCRIPTION OF THE INVENTIVE METHOD AND STRUCTURE

Figure 2A:
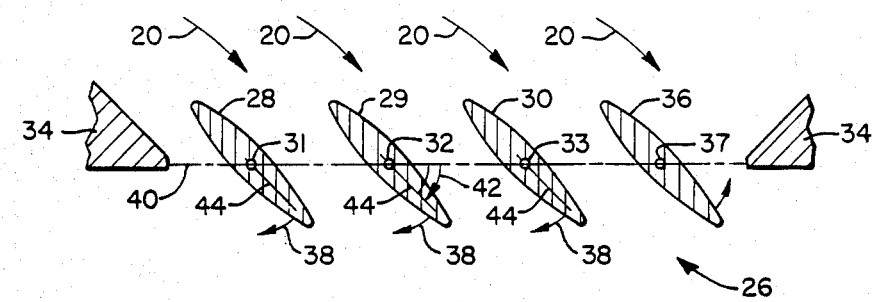
FIGS. 2a, 2b, and 2c show a schematic view of a vane cascade according to the present invention operating over a vectoring range of motion.

FIG. 1a shows a cross-sectional view of an exhaust nozzle 10 taken through the central axis 12 of the gas turbine engine (not shown) and the nozzle 10. The nozzle is of 2D configuration, having a pair of spaced-apart sidewalls 14 and movable upper and lower flap assemblies 16, 18 extending therebetween. Such nozzles typically discharge the exhaust gas 20 from the gas turbine engine rearwardly for providing forward thrust for driving an aircraft or the like.

Occasionally it is desired to provide reverse or other direction thrust for the purpose of maneuverability or for arresting velocity during landing of the aircraft. The nozzle as shown in FIGS. 1a and 1b may provide such alternative thrusting capability as shown in FIG. 1b wherein the forward flaps 22, 24 of the flap assemblies 16, 18 pivot into a blocking relationship with respect to the axial exhaust flow path defined as in FIG. 1a.

Exhaust gases 20 thus are diverted laterally as shown in FIG. 1b, passing out of the nozzle 10 through opposed vane cascades 26. As will be described in more detail hereinbelow, the opposed cascades 26 contain a plurality of movable vanes for selectably directing the flow of exhaust gases 20. Such a nozzle as shown in FIGS. 1a and 1b is disclosed and described in greater detail, although without the vane cascades 26 according to the present invention, in U.S. Pat. No. 4,641,782 issued to Woodward.

FIRST EMBODIMENT

Figure 2B:
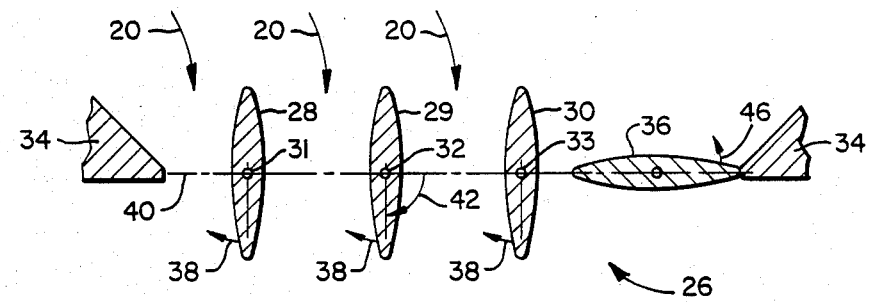

FIGS. 2a and 2b show an individual vane cascade 26 according to the present invention. Exhaust gases 20, possibly diverted from the axial gas flow path as shown in FIGS. 1a and 1b, flow into the vane cascade 26 from above as shown. The vane cascade 26 includes a plurality of cascade vanes 28, 29, 30, each pivotable about a corresponding axis 31, 32, 33, extending spanwisely through the respective vane 28, 29, 30. FIG. 2a shows the cascade vanes 28, 29, 30 in a first, forward thrust position wherein the vanes 28, 29, 30 are pitched rearwardly for diverting the exhaust gas 20 for producing thrust in the opposite, or forward direction. A static structure 34 surrounds and supports the cascade 26 by any of a number of means, such as bearings at the vane span ends, well known in the art and not discussed further herein.

Figure 2C:
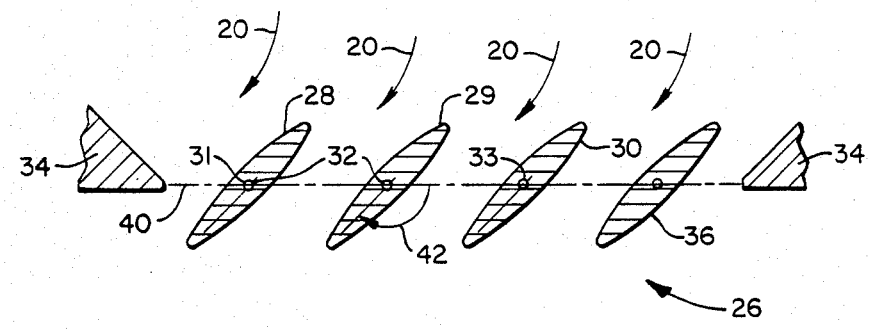

According to the present invention, the vane cascade 26 is provided with a flow regulating vane 36 disposed adjacent to one of the cascade end vanes 30 and pivotable about a spanwisely extending axis 37 which is parallel to the axes 31, 32, 33 of the cascade vanes 28, 29, 30. As shown in FIG. 2a and in subsequent FIGS. 2b and 2c, cascade vanes 28, 29, 30 are pivotable 38 in unison about their respective pivot axes 31, 32, 33 for selectably directing the exhaust gas 20 laterally as shown in FIG. 2b, or forwardly as shown in FIG. 2c, as well as a variety of other directions therebetween. For purposes of reference hereinafter the lateral discharge as shown in FIG. 2b is termed "a second position" wherein the cascade vanes 28, 29, 30 are oriented generally normal to the plane 40 of the cascade defined by the cascade vane axes 31, 32, 33. Such second position vanes, by directing the exhaust gas laterally with respect to the cascade 26, produce a high lateral thrust without a significant axial component.

As discussed in the Background section hereinabove, the gas flow area defined by a plurality of vanes pivotable in unison is a function of the sine of the angle 42 formed between the chordal lines 44 of the vanes 28, 29, 30 and the plane 40 of the vane cascade. The undesirable variation in area as the cascade vane angle varies over a vectoring range of motion defined by the first, 45° position of FIG. 2a, the second 90° position of FIG. 2b and the third 135° position of FIG. 2c is controlled by the opposite rotation 46 of the first flow regulating vane 36 as shown in FIGS. 2a–c. Thus, in FIG. 2a, the flow regulating vane 36 is oriented chordally parallel to the adjacent end vane 30, for directing the exhaust gases 20 rearwardly in parallel with the cascade vanes 28, 29, 30.

As is shown in FIG. 2b, the flow regulating vane 36 has rotated so as to be chordally perpendicular with respect to the adjacent end vane 30, blocking off a portion of the cascade 26 thus helping to maintain the gas flow area therethrough.

As will further be apparent from examining FIGS. 2b and 2c, the flow regulating vane 36 has continued to pivot oppositely with respect to the cascade vanes 28, 29, 30, thus again becoming chordally parallel thereto and contributing to directing the exhaust gas 20 in the forward direction for generating rearward or reversing thrust.

The flow regulating vane 36, by rotating oppositely with respect to the unison cascade vanes, 28, 29, 30 as they move in the gas thrust vectoring range of motion defined by FIGS. 2a–2c, maintains a nearly constant collective gas flow area therethrough, avoiding undesirable and possibly destabilizing exhaust area variations. Unlike prior art vane manipulation systems and methods, the counter-rotating flow control vane 36 according to the present invention is a simple, geometrically-determined area regulating means which does not depend on predetermined scheduling of individual vanes to ensure the proper collective gas flow area. A variety of linkages or other actuating means may be used to position the vanes 28, 29, 30, 36 according to the method shown schematically in FIGS. 2a–2c. Several of such linkages are described hereinbelow.

As will be apparent from examining the motion of the vanes 28, 29, 30, 36 over the vectoring range of motion shown in FIGS. 2a–2c, when the cascade vanes 28, 29, 30 are moved into a stowed, or a flow-blocking relationship wherein each adjacent vane overlaps the next adjacent vane for forming an unbroken barrier against gas flow, the flow regulating vane 36, if it continues to rotate in the opposite direction with respect to the cascade vanes 28, 29, 30 will be oriented perpendicular to the plane 40 of the cascade 26. While such may not be a problem for a cascade 26 which is always passing a flow of gas 20 therethrough and is therefore never stowed, for certain applications, such as the vectoring nozzle 10 shown in FIGS. 1a and 1b, it is desirable to stow all such vanes in an overlapping, gas blocking relationship.

SECOND EMBODIMENT

Figure 3A:
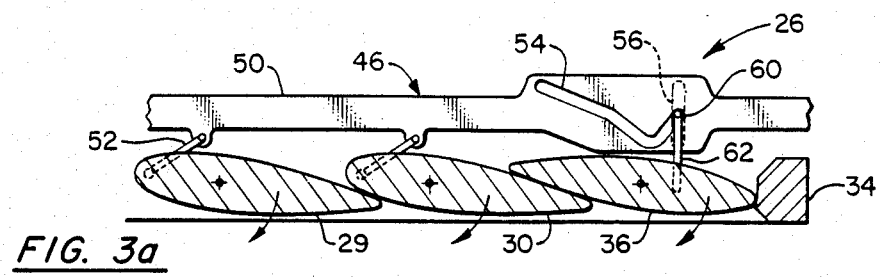
FIGS. 3a, 3b, 3c, and 3d show a cross-sectional view of a stowable vectoring vane cascade according to the present invention, including a drive linkage therefor.

This is accomplished according to the present invention by extending the range of movement of the flow regulating vane 36 to include a nutational rotation, reversing its relative rotation with respect to the cascade vanes 28, 29, 30 as the cascade vanes move from the first position into a stowed position as shown in FIG. 3a. The co-rotation of the flow regulating vane 36 in response to movement of the cascade vanes 28, 29, 30 in a stowing range of motion defined between the stowed position as shown in FIG. 3a and the first thrust vectoring position as shown in FIG. 3b allows the vane cascade 26 to open smoothly between a stowed, blocking mode wherein little or no gas flow 20 may pass therethrough, into the forward thrust mode wherein the gas 20 is diverted rearwardly by the pitched vanes 28, 29, 30, 36 as shown.

Figure 3B:
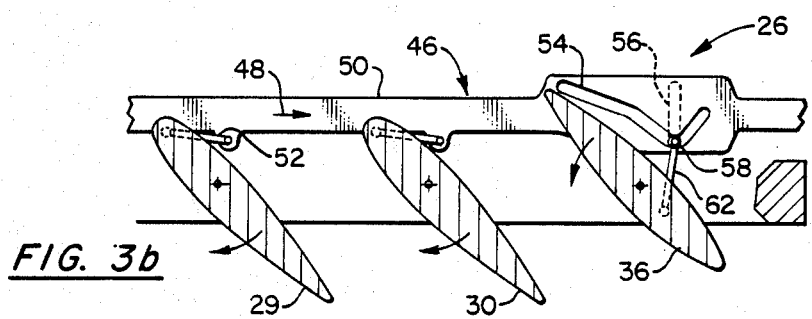
Figure 3C:
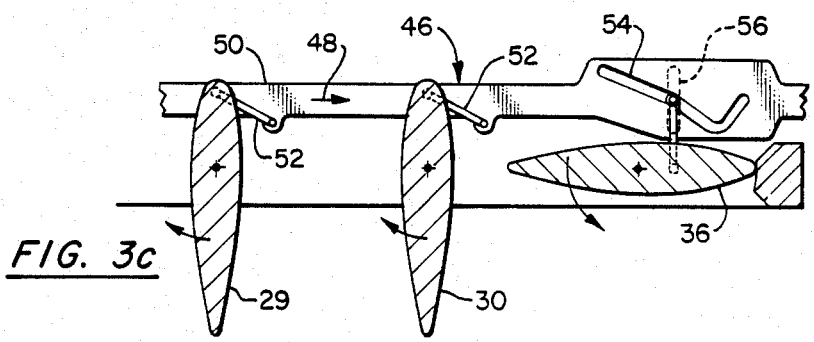
Figure 3D:
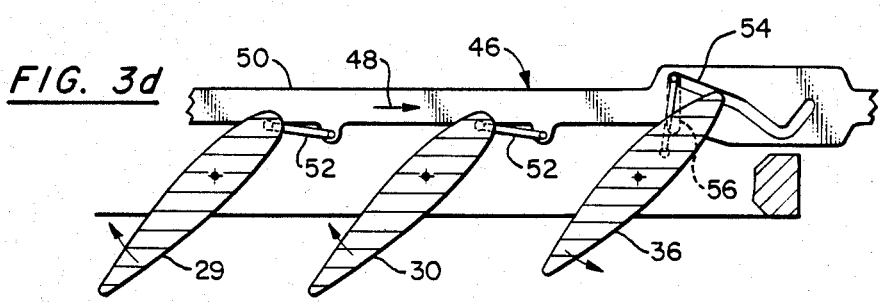

The reverse pivoting motion of the flow regulating flap 36 over the vectoring range of motion is shown in FIGS. 3b, 3c, and 3d which parallel FIGS. 2a, 2b, 2c discussed hereinabove. Such motion provides the same area controlling function as achieved by the simpler, purely counter-rotating vane system described above, but allows the achievement of the overlapping stowed position of FIG. 3a for aerodynamic, flow regulating, or other purposes.

FIGS. 3a–3d also disclose a linkage 46 for orienting both the cascade vanes 28, 29, 30 and the first flow regulating vane 36 in response to a single linear motion 48. This is accomplished through an elongated unison link 50 extending across the cascade 26 and being connected at a plurality of spaced-apart locations to each individual cascade vane 28, 29, 30 by a corresponding vane drag link 52.

The first flow regulating vane 36 is driven in a reversing, pivoting motion as required in this first embodiment linkage 46 by a first curved cam race 54 secured to the unison link 50 and movable therewith, and a second, static cam race 56 disposed in the surrounding static structure 34. A cam roller 60 rides in both races 54, 56, being driven in a transverse reciprocating motion with respect to the elongated unison link 50. The roller 60 drives a flow regulating vane link 62, drives the first flow regulating vane 36 directly via a pivot connection therewith.

As will be appreciated by those skilled in the art, this simple stroking motion of the first embodiment linkage 46 produces both the multi-vane unison motion for the cascade vanes 28, 29, 30, and the nutating movement of the first flow regulating vane 36, including corotation of the first flow regulating vane 36 as the cascade vanes 28, 29, 30 rotate through the stowing range of motion defined between the positions of FIGS. 3a and 3b, and the counter-rotating motion of the first flow regulating vane 36 as the cascade vanes 88, 29, 30 move through the thrust vectoring range of motion defined between the positions shown in FIGS. 3b, 3c, 3d.

THIRD EMBODIMENT

Figure 4A:
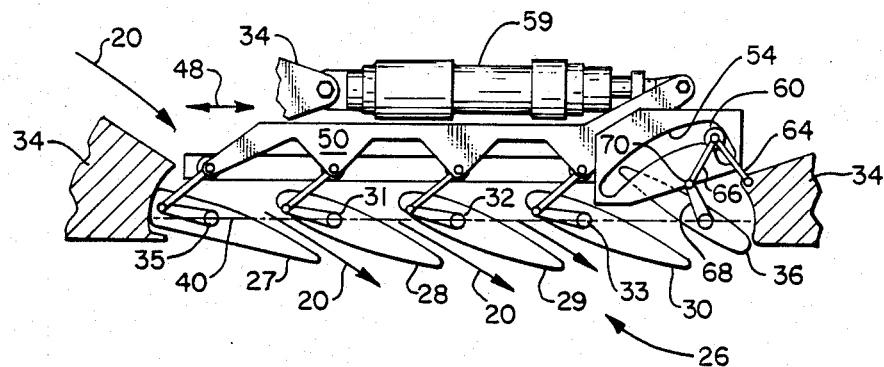
FIGS. 4a, 4b, and 4c show a stowable vectoring vane cascade with an alternative linkage therefor.

FIG. 4a shows a more detailed view of a further embodiment of a variable position vane cascade 26 according to the present invention. Cascade vanes 27, 28, 29, 30 pivot in unison about respective pivot axes 35, 31, 32, 33 responsive to the linear movement 48 of a unison link 50. The unison link 50 is driven by a linear actuator 59 secured between a portion of the link 50 and the static structure 34.

As in the second embodiment discussed hereinabove, a cam race 54 is secured to the unison link 50 and translates therewith. A cam roller 60 is received within the race 54 and is further pivotally secured to the static structure 34 by an idler link 64 which restrains the roller 60 against axial movement thereby resulting in a reciprocating motion transverse to the movement of the unison link 50 as the link 50 is stroked 48.

The transverse motion of the roller 60 imparts nutational motion to the flow regulating vane 36 via a linkage comprising the first flow regulating vane drive link 66 and a corresponding crank 68 pivotally secured to the roller 60 and to each other 70. By using a four bar linkage 64, 66, 68, 34 driven by the roller 60 and cam race 54, the apparatus, and especially the linkage thereof, according to the present invention provides a simple, powerful mechanism for orienting the vanes 27, 28, 29, 30, 36 as the cascade 26 is operated over both stowing and thrust vectoring ranges of motion.

In particular, the four bar linkage 64, 66, 68, 34 for driving the first flow regulating vane 36 may be modified by reconfiguring the cam race 54, or resizing the individual links 64, 66, 68, thereof to permit rescheduling or otherwise modifying the motion of the first flow regulating vane 36 in response to the engine nozzle outlet area requirement, thrust vectoring direction, or other parameters which may be influenced by the relative orientation of the first flow regulating vane 36 during operation of the cascade 26.

Figure 4B:
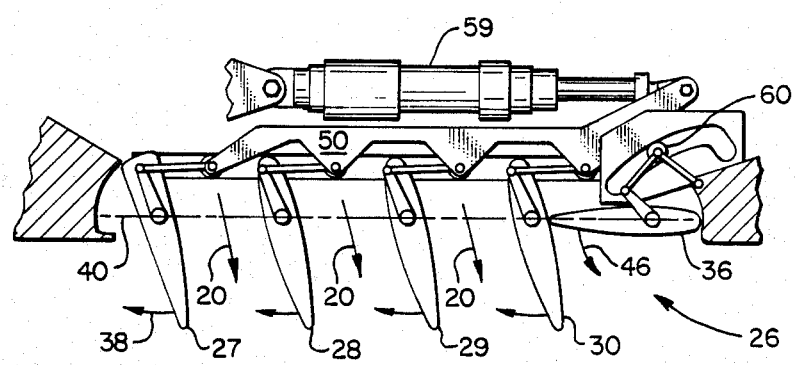
Figure 4C:
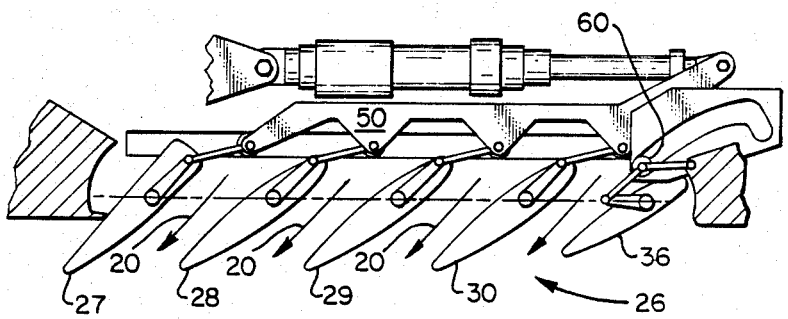

FIGS. 4a, 4b, and 4c depict the orientation of the individual vanes 27, 28, 29, 30, 36 of the cascade 26 at the first, second, and third positions which define the thrust vectoring range of motion. FIG. 4a shows the individual vanes pitched rearwardly for generating forward thrust by the discharged exhaust gas 20. As noted above, the first forward thrust position shown in FIG. 4a has been achieved by the corotation of the cascade vanes 27, 28, 29, 30 and the first flow regulating vane 36 in response to linear translation of the unison link 50 and the interaction of the cam roller 60 and the associated linkage 64, 66, 68. Cam roller 60 as shown in FIG. 4a has thus reached the top portion of the curved cam race 54 and will therefore begin to reverse the displacement of the cam roller 60 as well as the direction of rotation of the first flow regulating vane 36 upon further movement of the unison link 50 in the rearward or righthand direction.

FIG. 4b shows the cascade vanes 27-30 in the second or lateral thrust vectoring position, wherein the cascade vanes of FIG. 4b have rotated 38 into a substantially normal orientation with respect to the cascade plane 40 and wherein the counter-rotation 46 of the first flow regulating vane 36 as induced by the reverse transverse displacement of the cam roller 60 has caused the first flow regulating vane 36 to move into a blocking orientation thereby reducing the collective cascade gas flow area.

FIG. 4c shows the vanes 27-30, 36 in the third, reverse thrust position wherein the first flow regulating vane 36 has moved into a chordally parallel orientation with respect to the adjacent cascade vane 30 for directing the exhausted gas 20 in a forward direction.

FOURTH EMBODIMENT

Figure 5:
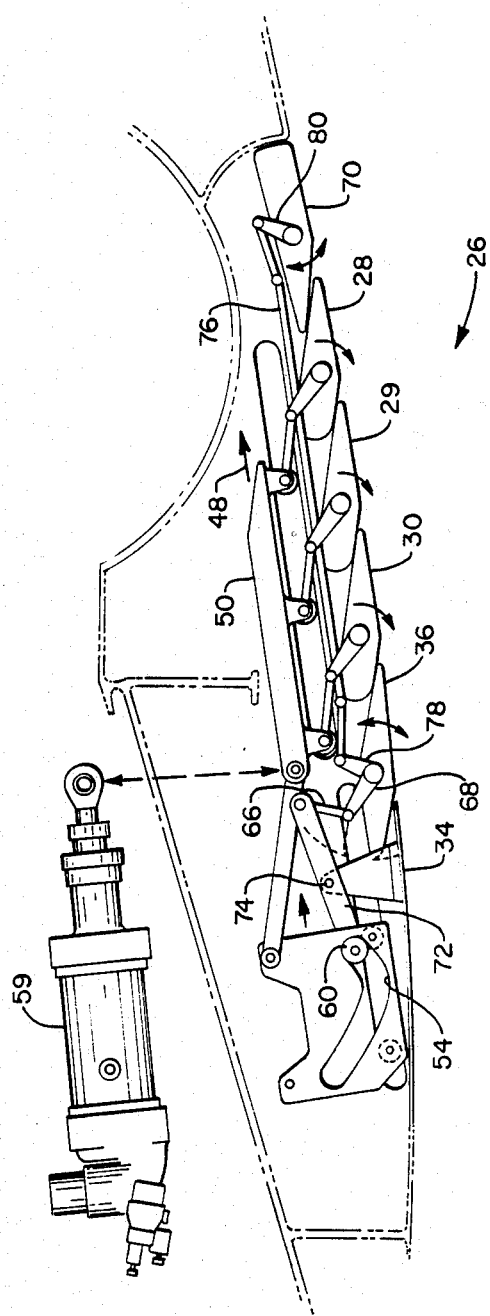
FIG. 5 shows a cross-sectional view of a vectoring vane cascade having double flow regulating vanes according to the present invention. A third embodiment of the linkage according to the present invention is also disclosed therein.

FIG. 5 shows still a further embodiment of the cascade assembly 26 according to the present invention, wherein two flow regulating vanes 36, 70 are provided for controlling the gas flow area of the cascade 26 over the vectoring range of motion thereof. As with the previous embodiments, a plurality of cascade vanes 28, 29, 30 rotate in unison under the influence of a unison link 50 driven by a linear actuator 59 shown displaced from its normal position for clarity. A cam race 54 is secured to the unison link 50 and reciprocates therewith for causing reversing transverse movement of the cam roller 60 as in the previous embodiments.

In this embodiment, the roller 60 drives a toggle link 72 pivotally secured 74 to the static structure 34 for driving the first flow regulating vane crank 68 via the first flow regulating vane drive link 66. The toggle link and crank arrangement 72, 66, 68 provides a more compact linkage over either the four bar linkage 64, 66, 68, 34 of the third embodiment, or the double cam arrangement of the second embodiment discussed hereinabove.

As the movements of the individual vanes 28, 29, 30, 36 have been well discussed hereinabove and are essentially similar in this equivalent, but distinct, embodiment, discussion herein shall be confined to only the additional linkage and movement induced in the second flow regulating vane 70 which extends spanwisely parallel with the other end vane 28 of the plurality of cascade vanes 30, 29, 28 and adjacent thereto.

The second flow regulating vane 70 rotates in unison with the first flow regulating vane 36 under the influence of the push rod 76 extending therebetween. First and second push rod cranks 78, 80 are secured to the respective regulating vanes 36, 70 for manipulating the second vane 70 in response to the rotation of the first vane 36.

The dual flow regulating vane arrangement of this fourth embodiment provides further flexibility to the cascade designer by permitting a greater portion of the available cascade flow area to be opened or closed as the cascade vanes 30, 29, 28 are positioned for directing the exhaust gas 20 over the vectoring range of motion. Such flexibility is useful in larger cascade arrangements wherein a single regulating vane may not provide adequate blocking or other area control capacity for reducing the undesirable gas flow area variation discussed above. It should be noted that the double vane concept of this embodiment is equally applicable to the preceding embodiments wherein it would be operable to achieve the enhanced flexibility and area control advantages discussed above.

FIG. 6 provides a graphical representation of the variation of the gas flow area of a cascade arrangement 82 according to the present invention and a prior art cascade arrangement 84 wherein the individual vanes pivot in unison for selectably directing a flow of gas therethrough. FIG. 6 shows the variation of the ratio of actual cascade flow area, $A_F$ to the maximum achievable cascade flow area $A_{MAX}$. For the prior art, uncontrolled vane cascade, the curve 84 shows a maximum area ratio occurring at the normal, or 90° orientation of the vanes with respect to the cascade plane 40. As noted in the Background section above, the area is a function of the sine of the vane angle, falling off on each side of the 90° maximum as the vanes pitch to one side or the other.

Curve 82 shows the beneficial results of using one or more flow regulating vanes according to the present invention. At the 45° and 135° locations, i.e., the first and third thrust vectoring positions, the area ratios are identical to that of the prior art system 84. As the cascade vanes are rotated into the lateral thrust, 90° orientation, i.e., the second position, the flow regulating vane or vanes have moved to block off a portion of the cascade gas flow area, thus maintaining the collective cascade area approximately constant over the critical range of motion.

The cascade arrangement according to the present invention has thus been disclosed in four equivalent embodiments well adapted for achieving the objects and advantages set forth hereinabove. It will be appreciated by those skilled in the art that such objects and advantages may also be achieved by further, essentially equivalent, embodiments thereof; therefore the above-mentioned structures should not be considered in a limiting sense, but rather as being simply illustrative of the preferred and alternative embodiments of the invention.

I claim:

1. A method for achieving a constant collective gas flow area through a cascade having a plurality of adjacent individual vanes each pivotable in unison about a corresponding plurality of parallel pivot axes lying in a plane, said cascade vanes further being pivotable over a thrust vectoring range of motion including a first pitched orientation, a second orientation normal to the plane of the cascade, and a third pitched orientation opposite to the first orientation, wherein the method comprises the steps of:
   providing a first flow regulating vane adjacent one end vane of the plurality of cascade vanes, the first flow regulating vane being pivotable about an axis parallel to the plurality of cascade vane pivot axes,
   pivoting the first flow regulating vane oppositely with respect to the pivoting of the cascade vanes over the thrust vectoring range of motion.

2. A method for achieving a constant collective gas flow area through a cascade having a plurality of adjacent individual vanes each pivotable in unison about a corresponding plurility of parallel pivot axes lying in a plane, said cascade vanes further being pivotable over a thrust vectoring range of motion including a first pitched orientation, a second orientation normal to the plane of the cascade, and a third pitched orientation opposite to the first orientation, wherein the method comprises the steps of:
   providing a first flow regulating vane adjacent one end vane of the plurality of cascade vanes, the first flow regulating vane being pivotable about an axis parallel to the plurality of cascade vane pivot axes,
   pivoting the first flow regulating vane oppositely with respect to the pivoting of the cascade vanes over the thrust vectoring range of motion, further comprising the steps of
   orienting the first flow regulating vane chordally parallel with the one end vane when the cascade vanes are in the first pitched orientation,
   orienting the first flow regulating vane perpendicular to the one end vane when the cascade vanes are in the second, normal position, and
   orienting the first flow regulating vane chordally parallel to the one end vane when the cascade vanes are in the third, oppositely pitched orientation.

3. The method as recited in claim 2, further comprising the steps of:
   orienting the cascade vanes in the first pitched position at angle of 45° with respect to the plane of the cascade, and
   orienting the cascade vanes in the third pitched position at an angle of 135° with respect to the plane of the cascade.

4. A vane cascade for exhausting a vectorable flow of gas therethrough, comprising:
   a plurality of spanwisely parallel cascade vanes, each vane pivotable about a corresponding parallel pivot axis passing therethrough,
   a first flow regulating vane, disposed adjacent one end vane of the plurality of cascade vanes and pivotable about an axis parallel to the cascade vane pivot axes,
   means for pivoting the cascade vanes in unison over a thrust vectoring range of motion between a first pitched orientation with respect to the plane of the cascade, a second normal orientation with respect to the plane of the cascade, and a third, oppositely pitched orientation with respect to the cascade, and
   means, responsive to the orientation of the cacade vanes, for pivoting the first flow regulating vane in the opposite angular direction from the cascade vanes as the cascade vanes move within the thrust vectoring range of motion.

5. A vane cascade for exhausting a vectorable flow of gas therethrough comprising:
   a plurality of spanwisely parallel cascade vanes, each vane pivotable about a corresponding parallel pivot axis passing therethrough,
   a first flow regulating vane, disposed adjacent one end vane of the plurality of cascade vanes and pivotable about an axis parallel to the cascade vane pivot axes,
   means for pivoting the cascade vanes in unison over a thrust vectoring range of motion between a first pitched orientation with respect to the plane of the cascade, a second normal orientation with respect to the plane of the cascade, and a third, oppositely pitched orientation with respect to the cascade,
   means, responsive to the orientation of the cascade vanes, for pivoting the first flow regulating vane in the opposite angular direction from the cascade vanes as the cascade vanes move within the thrust vectoring range of motion, and wherein the means for pivoting the first flow regulating vanes further comprises:
means for aligning the first flow regulating vane chordally parallel with the one end vane when the cascade vanes are in the first pitched position,
means for orienting the first flow regulating vane perpendicular to the one end vane when the cascade vanes are in the second, normal position, and
means for aligning the first flow regulating vane chordally parallel with the one end vane when the cascade vanes are in the third, pitched orientation.

* * * * *